United States Patent [19]

Cook

[11] Patent Number: 5,616,543
[45] Date of Patent: Apr. 1, 1997

[54] LUBRICATING OIL COMPOSITIONS

[75] Inventor: Stephen J. Cook, North Humberside, England

[73] Assignee: BP Chemicals (Additives) Limited, London, England

[21] Appl. No.: 613,312

[22] Filed: Mar. 11, 1996

[30] Foreign Application Priority Data

Mar. 10, 1995 [GB] England .................................. 9504914

[51] Int. Cl.$^6$ ................................................. C10M 133/44
[52] U.S. Cl. ............................................................. 508/239
[58] Field of Search ...................................... 508/232, 239

[56] References Cited

U.S. PATENT DOCUMENTS

| | | | |
|---|---|---|---|
| 2,490,744 | 12/1949 | Trigg et al. | 508/232 |
| 3,219,666 | 11/1965 | Norman | 508/232 |
| 4,388,198 | 6/1983 | Butcosk | 508/232 |
| 5,266,081 | 11/1993 | Avery et al. | 44/331 |

*Primary Examiner*—Jacqueline V. Howard
*Attorney, Agent, or Firm*—Nixon & Vanderhye

[57] ABSTRACT

A lubricating oil composition suitable for use in low- or medium-speed diesel engines comprising a fuel oil with a residual oil content characterised in that the lubricating oil composition further comprises a "black paint" reducing amount of the product obtained by the reaction at elevated temperature of a hydrocarbyl-substituted succinic anhydride with either serine or an aminosalicylic acid.

9 Claims, No Drawings

LUBRICATING OIL COMPOSITIONS

The present invention relates to lubricating oil compositions and in particular to lubricating oil compositions suitable for medium- or low-speed diesel engines, typically the four-stroke trunk-piston engine, and to fuel compositions.

Lubricating oils for medium- or low-speed diesel engines are known and will typically contain a range of additives which will perform a variety of functions, for example they may comprise dispersants to minimise deposit formation in various parts of the engine or detergent additives. However contamination of these lubricating oil compositions with unburnt residual fuel oil is a problem recognised in the industry. This leads to severe engine cleanliness problems in service which is sometimes referred to as "black paint". The problem is particularly widespread in 4-stroke trunk-piston engines where dirty cam boxes and crankcases are encountered. However, the problem is not confined to 4-stroke engines; 2-stroke cross-head engines can also suffer from the problem. These 2-stroke engines will usually use two separate lubricating oils, one for the crankcase and one for the cylinder, but it is in the crankcase where the heavy deposits potentially occur.

It might be expected that the problem would be overcome simply by using more of the conventional dispersant additive in the lubricating oil but this measure has met with very limited success. However, we have now found that the aforementioned problem is solved by including in the lubricating oil compositions the product formed by the reaction of a hydrocarbyl-substituted succinic anhydride with either serine $HOCH_2CH(NH_2)COOH$, or an aminosalicylic acid.

The reaction product of a hydrocarbyl-substituted succinic anhydride with an aminosalicylic acid is already known as an intermediate in the production of lubricant additives and fuel additives having carburettor detergency. Thus U.S. Pat. No. 5266081 discloses a lubricant or fuel additive comprising a reaction product of (a) an intermediate reaction product of a hydrocarbon-substituted succinic anhydride and an aminosalicylic acid; (b) an aldehyde; (c) an alkylenepolyamine; and (d) a hydrocarbon-substituted succinic anhydride which is the same as or different from (a).

According to the present invention there is provided a lubricating oil composition suitable for use in low- or medium-speed diesel engines comprising a fuel oil with a residual oil content characterised in that the lubricating oil composition further comprises a "black paint" reducing amount of the product obtained by the reaction at elevated temperature of a hydrocarbyl-substituted succinic anhydride with either serine or an aminosalicylic acid.

As regards the hydrocarbyl-substituted succinic anhydride, this may suitably have the formula:

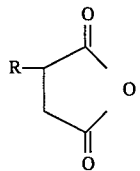

wherein R is a hydrocarbyl group containing from about 30 to 500, preferably from 50 to 200, carbon atoms. The hydrocarbyl group is preferably an aliphatic group which may be saturated or unsaturated and may be straight-chain or branched-chain. Preferred hydrocarbyl groups are derived from polyolefins, typically polymers of ethylene, propylene, butylene, or the like, or mixtures thereof. Of these, polybutenes and particularly polyisobutenes, are preferred. Polyisobutenes are commercially available from, for examples BP Chemicals Limited, in a range of HYVIS (RTM) products. So-called 'reactive' polyisobutenes, ie polyisobutenes wherein at least 50%, typically greater than 70%, of the terminal groups are vinylidene groups, are also commercially available from, for example BP Chemicals Limited as ULTRAVIS (RTM) PIB and from BASF as GLISSOPAL (RTM). The hydrocarbyl succinic anhydride may be derived from the reaction of a polyolefin with maleic anhydride either by a thermal route or by a halogenation route. This is a well-known reaction which is described in a variety of publications.

To form the product useful in the compositions of the present invention the hydrocarbyl-substituted succinic anhydride is reacted with either serine or an aminosalicylic acid. Suitable aminosalicylic acids are those of the formula (II):

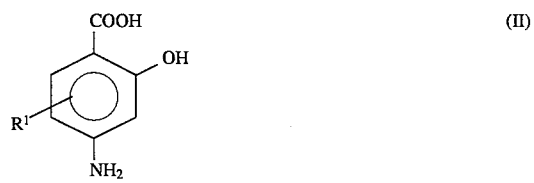

wherein $R^1$ is a hydrogen atom or a hydrocarbyl group containing from 1 to 60, preferably from 12 to 60, carbon atoms. $R^1$ may be either an alkenyl group, an alkyl group, an aromatic group or a heterocyclic group. Alternatively $R^1$ may be an alkenyl or alkyl group containing at least one heteroatom, for example an oxygen or a nitrogen atom. An example of a suitable aminosalicylic acid having the formula (II) is 5-aminosalicylic acid.

The elevated temperature at which the hydrocarbyl-substituted succinic anhydride is reacted with the serine or aminosalicylic acid may suitable be in the range from 50° to 250° C., preferably from 70° to 200° C.

The lubricating oil composition of the present invention will be suitable for use in either a low- or medium-speed engine especially a marine diesel engine. Typically such an engine can be a 4-stroke trunk piston engine having an engine speed of 50–1,000 rpm e.g. 100–500 rpm, and a brake horse-power (BHP) per cylinder of 10–3,000 preferably 250–2,000. The engine can also be a 2-stroke cross-head engine having a speed of 40–1,000 rpm preferably 100–500 rpm and a BHP per cylinder of 100–8,000.

In a further aspect of the present invention there is provided a method of reducing deposits in a low- or medium-speed diesel engine comprising lubricating the moving parts of the engine with a lubricating oil composition suitable for use in such an engine which comprises a fuel oil with a residual oil content characterised in that the lubricating oil composition further comprises the product obtained by the reaction at elevated temperature of a hydrocarbyl-substituted succinic anhydride with either serine or an aminosalicylic acid.

The lubricating oil compositions of the present invention will have a TBN in the range from 0.1 to 100 mgKOH/g. Where the composition is to be used in a 4-stroke trunk piston engine the TBN is preferably in the range from 5 to 70, more preferably from 8 to 50 mgKOH/g; where it is to be used in a 2-stroke cross-head engine and particularly for the crankcase, the TBN of the composition is preferably in the range from 0.1 to 15, more preferably in the range from 1 to 10 mgKOH/g.

The lubricating oil composition of the present invention will usually be a monograde lubricant i.e. one which exhibits little or no viscosity index improvement properties e.g. an SA30 oil.

As regards the lubricating oil, this may be any oil suitable for the lubrication of a low- or medium-speed diesel engine, particularly a marine diesel engine. The lubricating oil may suitably be an animal, a vegetable or a mineral oil. Suitably the lubricating oil is a petroleum-derived lubricating oil, such as a naphthenic base, paraffin base or mixed base oil. Alternatively, the lubricating oil may be a synthetic lubricating oil. Suitable synthetic lubricating oils include synthetic ester lubricating oils, which oils include diesters such as di-octyl adipate, di-octyl sebacate and tri-decyl adipate, or polymeric hydrocarbon lubricating oils, for example liquid polyisobutene and poly-alpha olefins. Commonly, a mineral oil is employed. The oil may be suitable for lubricating a low- or medium-speed marine diesel engine without adjustment of its viscosity. If viscosity adjustment is required it may be achieved by the addition of, for example, bright stock. The lubricating oil will generally comprise greater than 70° A by weight, typically greater than 80% by weight of the composition.

The lubricating oil composition will be contaminated with a fuel oil which has a residual oil content. Such a fuel oil will be suitable for use as a diesel fuel oil. Fuel oils can in general be divided into two main categories—distillates and heavy fuels. Distillates consist of one or more distilled fractions. Heavy fuels are fuels which comprise at least a proportion of a residual oil, that is an oil which remains after the distilled fractions have been removed from an unrefined oil. The composition of the residual oil will vary with the composition of the starting oil which is usually a crude oil and will also vary depending upon the distillation conditions. However, by its nature residual oil is of high molecular weight and high boiling point and the man skilled in the art will know what is meant by residual oil. Heavy fuels can also comprise, in addition to residual oil, distillates. However, heavy fuels will generally comprise at least 90%, for example at least 95%, typically at least 99% by weight residual oil. The present invention is concerned with lubricating oil compositions that are contaminated with a heavy fuel. The amount of heavy fuel in the lubricating oil composition will vary. Typically the composition will comprise between 0.1 to 25 e.g. 0.1 to 10, especially 0.3 to 5, more especially 0.5 to 3% by weight heavy fuel oil which as defined above is a fuel oil which has a residual oil content.

Suitably the amount of the aforesaid reaction product in the composition is at least 0.01%, preferably at least 0.05%, more preferably at least 0.10% by weight of the composition.

In addition to the lubricating oil and the product obtained by the reaction of a hydrocarbyl-substituted succinic anhydride with either serine or an aminosalicylic acid the composition of the invention may contain other additives, chief amongst which is a dispersant.

Although any type of dispersant may be employed in the composition, a suitable dispersant is one derived from a hydrocarbyl-substituted succinic acid or anhydride by reaction with an amine i.e. a hydrocarbyl-substituted succinimide e.g. a PIB succinimide. Such succinimides are well known in the art.

Succinimide production is described in, for example, U.S. Pat. No. 2,992,708; U.S. Pat. No. 3,018,291; U.S. Pat. No. 3,024,237; 3,100,673; 3,219,666; U.S. Pat. No. 3,172,892 and U.S. Pat. No. 3,272,746.

Succinimide dispersants which are mono- or bis- succinimides may be employed.

The amount of dispersant present in the low- or medium-speed diesel engine lubricating oil composition of the present invention may suitably be in the range from 0.01 to 5.0, preferably from 0.1 to 2.5% by weight based on the weight of the composition.

A preferred composition according to the present invention comprises from 0 to 5.0%, preferably from 0.10% to 3.0% of a hydrocarbyl-substituted succinimide dispersant, from 0.05 to 5.0%, preferably from 0.10% to 3.0% of the aforesaid reaction product and, comprising the remainder of the composition, a low- or medium-speed diesel engine lubricating oil.

In addition to the foregoing the composition may additionally contain additives conventionally employed in low- or medium-speed diesel engine lubricating oil compositions. Examples of such additives include detergents, foam inhibitors, extreme pressure/antiwear agents, rust inhibitors, antioxidants, and the like. Detergents generally employed in the compositions of the invention include hydrocarbyl-substituted alkaline earth metal phenates, salicylates, naphthenates, sulphonates or carboxylates, which may be normal or overbased materials. The detergent, in addition to providing detergency, is generally employed to adjust the total base number of the composition to a desired value, typically about 30 mg KOH/g.

The composition of the invention may be prepared by diluting a concentrate comprising a solution of the hydrocarbyl-substituted amine or polyamine and optionally the other additives referred to hereinbefore in a suitable carrier with low- or medium-speed diesel engine lubricating oil. As the carrier there may be employed any solvent for the product which is compatible both with the lubricating oil and with the use of the composition. The carrier may be any inert hydrocarbon solvent. The aforesaid reaction product may suitably be present in the concentrate in an amount in the range from 0.1 to 20% by weight.

The hereinbefore described products can also be used as detergents in fuels.

Accordingly in another aspect the present invention provides a fuel composition which composition comprises a fuel suitable for use in an internal combustion engine and a detergency improving amount of the product obtained by the reaction at elevated temperature of a hydrocarbyl-substituted succinic anhydride with either serine or an aminosalicylic acid.

The fuel may be a fuel suitable for use in either a spark ignition engine or a spark compression engine. Fuels suitable for the aforesaid purposes will be well-known to those skilled in the art.

A detergency improving amount of the aforesaid product will generally be an amount suitably up to 10, preferably up to 5, more preferably up to 2.5% by weight based on the weight of the composition.

The use of a product obtained by the reaction at elevated temperature of a hydrocarbyl-substituted succinic anhydride with either serine or an aminosalicylic acid as described hereinabove for reducing black paint in low- or medium-speed diesel engines is a further embodiment of the present invention.

The invention will now be further illustrated by reference to the following Example. In the Example the total sediment content of residual fuel contaminated compounded oils is determined in a "black paint test".

In the test method, an aliquot of the test oil which has previously been subjected to ageing at 100° C. for 24hr is filtered through a filter medium. After solvent washing and drying, the total sediment on the filter medium is weighed. The test is carried out in duplicate.

Results

The mass percentage of Total Sediment to the nearest 0.01% m/m is calculated using:

$$S = \frac{M1 - M2}{M3} \times 100$$

where

S=Total Sediment in % m/m

M1=Mass of filter medium after filtration in g

M2=Mass of filter medium before filtration in g

M3=Mass of sample filtered in g.

Example

A 1 liter round bottom wide neck flask was incorporated in an apparatus including flange lid and clip, clamp, overhead stirrer/gland/paddle, splash head/condenser/receiver adaptor/receiver flask and Eurotherm/mantle/thermocouple heating system.

The flask was charged with ULTRAVIS 10 polyisobutene succinic anhydride (PIBSA No. 97, effective molecular weight 1156) (228.9 g; 0.2 moles; 1 equivalent). [ULTRAVIS is a Registered Trade Mark] and 5-aminosalicylic acid (30.4g; 0.2 moles; 1 equivalent) and heated to 175° C. for 4 hours. At the end of this period the hot suspension was then filtered through a ½ inch Celite pad giving a clear dark brown liquid product containing 1.1% nitrogen.

The product was incorporated at a concentration of 1% by weight in a base line formulation containing a mixture of sulphonate and phenate detergents. Both the base line formulation and the formulation of the Example were tested in the "black paint" test. The results were as follows:

Base line formulation, S =0.485%

(ii) Base line formulation +1% by weight product of Example, S =0.235%.

The results demonstrate that the product formed by reacting a high vinylidene content polyisobutene substituted succinic anhydride with 5-amino salicylic acid is effective in reducing "black paint".

I claim:

1. A lubricating oil composition suitable for use in low- or medium-speed diesel engines comprising a fuel oil with a residual oil content characterised in that the lubricating oil composition further comprises a "black paint" reducing amount of the product obtained by the reaction at elevated temperature of a hydrocarbyl-substituted succinic anhydride with either serine or an aminosalicylic acid.

2. A lubricating oil composition according to claim 1 wherein the hydrocarbyl-substituent of the hydrocarbyl-substituted succinic anhydride contains from 50 to 200 carbon atoms.

3. A lubricating oil composition according to claim 1 wherein the hydrocarbyl-substituted succinic anhydride is reacted with serine.

4. A lubricating oil composition according to claim 1 wherein the hydrocarbyl-substituted succinic anhydride is reacted with an aminosalicylic acid having the formula (II):

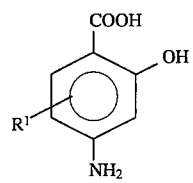

(II)

wherein $R^1$ is a hydrogen atom or a hydrocarbyl group containing from 1 to 60 carbon atoms.

5. A lubricating oil composition according to claim 4 wherein the aminosalicylic acid is 5-aminosalicylic acid.

6. A lubricating oil composition according to claim 1 for use in a 4-stroke trunk piston engine and having a TBN in the range from 5 to 70 mg KOH/g.

7. A lubricating oil composition according to claim 1 for use in a 2-stroke cross-head engine and having a TBN in the range from 0.1 to 15 mg KOH/g.

8. A lubricating oil composition according to claim 1 wherein the composition also contains a dispersant which is a hydrocarbyl-substituted succinimide.

9. A method of reducing black paint in a low- or medium-speed diesel engine comprising lubricating the moving parts of the engine with a lubricating oil composition suitable for use in such an engine which comprises a fuel oil with a residual oil content characterised in that the lubricating oil composition further comprises the product obtained by the reaction at elevated temperature of a hydrocarbyl-substituted succinic anhydride with either serine or an aminosalicylic acid.

\* \* \* \* \*